United States Patent Office 3,268,583
Patented August 23, 1966

3,268,583
ACETYLENIC AMIDES
George L. Moore, South Plainfield, and James F. Vitcha, New Providence, N.J., assignors, by mesne assignments, to Cumberland Chemical Corporation, New York, N.Y., a corporation of Delaware
No Drawing. Original application Feb. 20, 1961, Ser. No. 90,209. Divided and this application Oct. 30, 1962, Ser. No. 234,254
1 Claim. (Cl. 260—561)

This application is a division of our copending application, Serial No. 90,209, filed February 20, 1961.

This invention relates to aceylenic nitrogen compounds and to improved methods of preparing such compounds.

Although procedures are known for the preparation of nitrogen compounds of the acetylene series, i.e., nitrogen compounds having triple unsaturated carbon linkages, by the reaction of amines, acetylene and aldehydes, such procedures have not, in general, proved commercially feasible. The yields in these prior arts methods, for example, tend to be low, and, moreover, because of the nature of the prior art reactions, side products and by-products are formed to a considerable extent, and great difficulty is experienced in recovering the desirable reaction products.

According to the teachings contained herein, commercially feasible procedures for preparing nitrogen compounds of the acetylene series which avoid or alleviate many of the problems in the prior art have been discovered.

According to the present invention, there have been prepared propargyl amines having the formula:

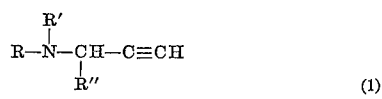
(1)

Further in accordance with the present invention there have been prepared diamino butynes having the formula:

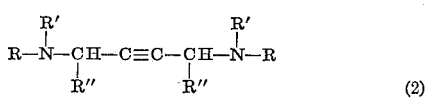
(2)

Still further in accordance with the present invention there have been prepared dipropargyl amines of the formula:

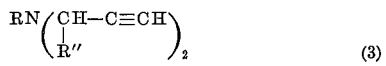
(3)

In Formulae 1 to 3, inclusive, R may be an aliphatic, aryl, alkyl aryl or alicyclic hydrocarbon radical; R' may be an aliphatic, aryl, alkyl aryl or alicyclic hydrocarbon radical or hydrogen; or the part

may represent a heterocyclic base, namely, piperidine, morpholine or pyrrolidine.

When R and R' are hydrocarbon radicals, these will usually have fewer than 20 and preferably fewer than 10 carbon atoms in the chain. Typically, R and R' may be aliphatic hydrocarbon radicals, such as propyl, isopropyl, n-buytl, isobutyl, tertiary butyl, hexyl, 2-ethyl hexyl, isononyl, n-nonyl, 3,5,5-trimethyl pentyl, 1,1,3,3-tetramethylbutyl, and the like, including the isomeric alkyl derivatives thereof. R and R' may also be alicyclic hydrocarbon radicals, such as cyclopentyl, cyclohexyl, cycloheptyl, cyclooctyl, and so forth. When R and R' are aryl or alkyl aryl groups, these may have one or more uncondensed benzene nuclei. Preferably, however, R and R' have one uncondensed benzene nucleus. Typical of such groups may be mentioned phenyl and its homologues, such as tolyl, xylyl, and so forth.

In Formulae 1 to 3 above, R" may be hydrogen or a lower alkyl radical having up to 6 carbon atoms. Usually R" will be hydrogen, as will be clear from the following description.

As will be more clear from the following description, the groups R, R', or the part

in the above formulae will correspond to the radicals making up the primary or secondary amines or cyclic imines used to prepare the acetylenic nitrogen compounds. The group R" will correspond to the hydrocarbon radical making up the carbonyl compounds used in the reactions, or hydrogen.

These and other amino compounds of the acetylene series, i.e., amino compounds having triple unsaturated carbon linkages, have been prepared by reacting amines, including cyclic imines, having at least one active hydrogen attached to the amino nitrogen, aldehydes and acetylene in an inert reaction medium and in the presence of catalysts.

Typical reaction mechanisms for the compounds represented in Formulae 1 to 3, inclusive, may be represented as follows:

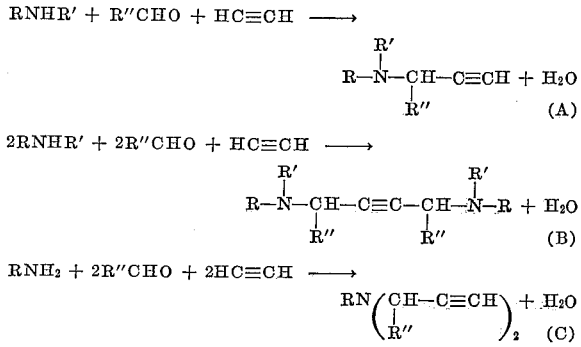

As catalysts suitable for carrying out the above reactions may be mentioned the heavy metals of subgroups I–B and II–B of the Periodic Table of Elements and their compounds, as, for example, organic and inorganic salts of copper, such as the chloride, acetate, formate, and so forth. Also may be mentioned the acetylides of such heavy metals, for example, acetylene-copper compounds. Other catalysts, such as Adkins catalyst, i.e., copper-barium chromite, may also be used. Among the catalysts, the copper salts, and more particularly the cupric salts, are especially suitable. Particularly good results are obtained with cupric chloride, and this material is preferred.

The catalyst or mixtures thereof may, if desired, be used with suitable inert carriers, such as, for example, finely divided alumina, diatomaceous earth, silica, silica gel, kieselguhr, and mixtures of the foregoing.

Primary and secondary amines, as well as cyclic imines, and mixtures of the foregoing, are useful in preparing the acetylenic amino compounds described herein. When aliphatic amines are used, these may be primary or secondary amines having straight chains or branched chains typified by the following: methyl, ethyl, propyl, isopropyl, n-butyl, isobutyl, tert.-butyl, hexyl, 2-ethylhexyl, isononyl, n-nonyl, 3,5,5-trimethylpentyl, 1,1,3,3-tetramethylbutyl groups and the isomeric alkyl derivatives thereof. When secondary amines are used, the hydrocarbon radicals attached to the amino nitrogen may be the same or different. As will be clear from the examples, best results are achieved with the secondary amines. As examples of the saturated monocyclic heterocyclic amino compounds, or, more properly, cyclic imines, may be mentioned morpholine, piperidine and pyrrolidine. Both primary and secondary aryl or alkyl aryl amines may be used, depending upon the type of acetylenic amino compounds desired. Of the aryl compounds, the aromatic amines having a single benzene nucleus are preferred. Among these may be mentioned aniline, toluidine, xylidine, and the mono-alkyl derivatives thereof, such as monomethyl aniline, monoethyl aniline, and other mono-alkyl phenyl amines having up to about 10 carbon atoms in the alkyl group. Typical of the alicyclic amines may be mentioned cyclopentylamine, cyclohexylamine, cycloheptylamine, cyclooctylamine, and so forth. Also may be mentioned the mono-substituted alicyclic amines, such as cyclopentyl ethyl amine, cyclohexyl methyl amine, and so forth. When primary and secondary amines are used, these preferably have fewer than a total of 20 carbon atoms. Other suitable amines and cyclic imines will readily suggest themselves to those skilled in the art from the foregoing description.

The reaction of the above described amino nitrogen compounds with acetylene and aldehydes is carried out in an inert solvent medium. Care should be exercised in selecting the solvent to prevent undesirable by-product and side-product formation and to avoid tedious recovery procedures. It has also been discovered that the choice of reaction medium has a significant effect on the yields achieved.

In general, non-polar solvents which are inert to both the starting materials and the reaction products and which are readily volatilizable may be used. Among such solvents, saturated or unsaturated aliphatic hydrocarbons which are liquid at atmospheric conditions are especially suitable. Preferred for use are saturated aliphatic hydrocarbons having 6 to 19 carbon atoms.

The aldehydes suitable for use in the present invention may be described as simple aldehydes having one carbonyl radical. Although carrying out the reaction with aldehydes containing more than 1 carbonyl radical is feasible, in general, the use of such materials causes undesirable side reactions. Among the particularly important aldehydes may be mentioned formaldehyde, including formalin (an aqueous solution of about 37 percent by weight of formaldehyde) and methyl Formcel (a solution of about 55 percent by weight of formaldehyde in methanol), acetaldehyde, and other simple aldehydes having fewer than about 6 carbon atoms. The precursors of formaldehyde, e.g., the cyclic trimer known as trioxan, and the linear polymers of formaldehyde, known as polyoxymethylenes, as well as the cyclic polymer of acetaldehyde, known as paraldehyde, may be advantageously employed.

Although any of the above described aldehydes may be used, it has been discovered that greatly superior results are obtained in preparing compounds of the Formulae 1 to 3 described hereinabove when linear polymers of formaldehyde are used. Such polymers are polyoxymethylenes of the formula

$$HOCH_2\text{—}O\text{—}[CH_2O]_n\text{—}CH_2OH$$

where $n$ is an integer up to 100. Especially good results are obtained when trioxymethylene, which is commonly referred to as paraformaldehyde, is employed, and this material is preferred.

The acetylene used in the reaction may be highly concentrated acetylene, or acetylene diluted with foreign gases which are inert to the reaction. Electric arc acetylene, for example, may be used.

The method of contacting the reactants is important. Thus, it has been discovered that greatly improved yields are obtained by suspending the aldehyde in an inert non-polar solvent containing the catalyst, subjecting this reaction medium to an atmosphere comprising acetylene, and adding the amine to the resulting environment.

Care should be taken in adding the amino nitrogen compound to avoid the presence of excess unreacted amino nitrogen compound in the reaction medium. Thus, too rapid an addition of the amino nitrogen compound results in decreased yields of desirable products and production of by-products, side products and tars. The rate of addition of the amino nitrogen compound should be slow enough so as to avoid the presence of excess unreacted amine in the reaction mixture. In general, the rate of addition of the amine should be such that at any given time less than about 25 mole percent, and preferably less than about 10 mole percent of unreacted amino nitrogen compound is present in the reaction mixture, based upon the moles of unreacted aldehyde in the reaction mixture. The rate of addition of the amine, in terms of moles of amino nitrogen compound per minute per mole of aldehyde in the reaction mixture, may vary between about 0.0005 and 0.15, is usually between about 0.005 and 0.015, and is preferably between about 0.0025 and 0.030.

The proportion of amine to aldehyde is also important. In general, the molar ratio of amine to aldehyde may vary between about 0.80 and 1.20:1 and is preferably between about 1.0 and 1.10:1. When polymers of the aldehydes are employed, the above described molar ratios are based upon moles of equivalent aldehyde and not moles of the polymers. When paraformaldehyde is used, for example, a molar ratio of amine to paraformaldehyde of between about 1.0 and 1.10:1 is preferred, and a molar ratio of about 1.05:1 is optimum, the molar ratios being based on HCHO.

If desired, the reaction may be carried out under anhydrous conditions, and in some instances, this may be preferable. Any suitable dehydrating agent which is inert to reactants and to the products of reaction may be used to take up the water produced by the reaction. Such dehydrating agents are well understood in the art. As a typical example may be mentioned anhydrous sodium sulfate.

The temperature and pressure of reaction should be high enough to cause reaction to occur, but below the temperature and pressure at which tar and undesirable side products and by-products form. The temperature of reaction may vary between about 40° C. and 90° C., or higher, and is preferably between about 50° C. and 60° C. At the lower part of the range, the reaction appears to be sluggish, while at the upper part of the range, secondary products, as well as side products and tars, tend to form. Although the reaction may be carried out at pressures between about 2 and 40 atmospheres, reaction pressures of between about 125 to 250 p.s.i.g. are especially advantageous, and are preferred.

The invention will be more fully understood from the following examples, which, although illustrative, are not intended to limit the scope of the invention, except as such limitations may appear in the claim.

EXAMPLE 1

The reactor comprises a one-liter, upright, stainless steel autoclave equipped with an agitator, thermocouple well, acetylene gas burette, liquid amine burette, a proportioning pump for the liquid amine burette, and a pressure regulator for the acetylene gas burette.

Seventy-five grams of anhydrous n-hexane, 59.4 grams of paraformaldehyde (90% trioxymethylene), which have been desiccated over sodium hydroxide pellets, and 6.02 grams of anhydrous powdered cupric chloride are charged to the autoclave liner. The autoclave is assembled, and pressure tested by purging with nitrogen. The system is then purged with acetylene, bled off to 25 p.s.i.g., and then heated to 60° C. Acetylene is then added to bring the pressure up to 150 to 175 p.s.i.g. and maintained at this pressure throughout the reaction by means of the gas burette and pressure regulator. The acetylene used is purified by passing it through a Dry Ice trap and activated alumina.

Diethylamine having a boiling point of 55° to 56° C. at 1 atmosphere pressure is charged to the amine burette. The diethylamine is added to the reaction mixture in the autoclave over a period of about three and one-half hours at a uniform rate of about 0.65 gram/minute. The proportioning pump is used to insure a uniform rate of addition. The total charge of diethylamine is 137.2 grams. At the completion of the amine addition, the reaction is continued until no more acetylene is taken up. This point is reached approximately one hour after completion of the diethylamine addition. The mixture is then cooled and discharged from the autoclave.

The mixture is filtered through a medium sintered glass Buchner funnel. The small filter cake obtained is washed once with a small portion of n-hexane and the filter cake is discarded. Caution is necessary to insure that the filter cake is not allowed to dry. After washing, dilute hydrochloric acid is added immediately to destroy any copper acetylide present.

A small water layer which appears in the filtrate is separated and discarded. It weighs about 33.4 grams and contains 5.0 percent by weight of diethylamine.

The hexane layer is then distilled through a small Vigreux column under reduced pressure with the pressure being lowered gradually as the distillation progresses. A nitrogen atmosphere is maintained during the distillation. The distillation data are tabulated in Tables I to III.

*Table I*

| Pot Temp., ° C. | Head Temp., ° C. | Press., mm. | Cut |
|---|---|---|---|
| 43–59 | 35–28 | 255–170 | Cut A (included Dry Ice trap contents). |
| 59–92 | 38–54 | 170–30 | Cut B (crude product). |
| 104–140 | 80–101 | 4.0 | Cut C, 14.5 g. (contains 15.0% butynediol). Pot residue (brown oil-tar), 3.0 g. |

Cut C is mainly bis(diethylamino)butyne.

Cut A is next fractionated through a small packed column starting at atmospheric pressure and maintaining a nitrogen atmosphere.

*Table II*

| Pot Temp., ° C. | Head Temp., ° C. | Press., mm. | Cut |
|---|---|---|---|
| 72–96 | 56–68 | 1 atm. | Cut 1, water layer, 4.4 g.; organic layer, 131.5 g. (contains 4.7% diethylamine). |

Cut B above is added to the still pot and the distillation resumed under reduced pressure.

*Table III*

| Pot Temp., ° C. | Head Temp., ° C. | Press., mm. | Cut |
|---|---|---|---|
| 41–58 | 38–50 | 75 | Cut 2, 7.4 g. (64.0% propargyl diethylamine). |
| 58–96 | 54–58 | 75 | Cut 3, 164.6 g. (97% or higher propargyl diethylamine). Pot residue (orange liquid), 2.2 g. |

The percent conversion of the diethylamine to acetylenic amines is 90.1% of theoretical. Of this conversion, an 83.0% yield of propargyl diethyl amine and a 7.1% yield of bis(diethylamino)butyne are achieved. The amount of diethylamine recovered indicates that the diethylamine has combined in practically stoichiometric proportions with the paraformaldehyde, i.e., the amine recovered is about equal to the molar excess of diethylamine added, based on the paraformaldehyde.

EXAMPLE 2

For comparison purposes, Example 1 is repeated, with the exception that formalin (a 37% by weight aqueous solution of formaldehyde) is used in place of the n-hexane and paraformaldehyde. The yield of propargyl diethylamine is 59.5% of theoretical, and the yield of bis(diethylamino)butyne is 6.1% of theoretical, for a total yield of acetylenic amines of 65.6%, which is considerably below that obtained in Example 1.

EXAMPLE 3

For comparison purposes, Example 1 is repeated, with the exception that methyl Formcel (a 55% solution of formaldehyde in methanol) is used in place of n-hexane and paraformaldehyde. Other conditions are identical to those of Example 1. A 49.5% conversion to amino propyne and a 2.3% conversion to diamino butyne are achieved.

EXAMPLE 4

Example 1 is repeated, with the exception that the ratio of diethylamine and paraformaldehyde to n-hexane and catalyst was doubled. Yields comparable to those of Example 1 are obtained.

EXAMPLE 5

Example 1 is repeated, with the exception that dibutylamine is substituted for diethylamine. Yields of propargyl dibutylamine and bis(dibutylamino)butyne comparable to the yields indicated in Example 1 are obtained.

EXAMPLE 6

Example 1 is repeated, with the exception that dimethylamine is substituted for diethylamine. Yields of propargyl dimethylamine and bis(dimethylamino)butyne comparable to the yields indicated in Example 1 are obtained.

EXAMPLE 7

Example 1 is repeated, with the exception that the cyclic imine, morpholine, is substituted for diethylamine. Yields of 8.3% bis(morpholino)butyne and 72.6% of N-propargyl morpholine, for a total yield of 80.9% of acetylenic amino compounds, are achieved.

EXAMPLE 8

Example 1 is repeated, with the exception that pyrrolidine is substituted for diethylamine. Yields of bis(pyrrolidino)butyne and N-propargyl pyrrolidine comparable to the yields indicated in Example 7 are achieved.

EXAMPLE 9

Example 1 is repeated, with the exception that piperidine is substituted for diethylamine. Yields of bis(piperidino)butyne and N-propargyl piperidine comparable to the yields indicated in Example 7 are achieved.

EXAMPLE 10

Using the procedure described in Example 1, N-ethylaniline is reacted with acetylene and paraformaldehyde in the presence of a cupric chloride catalyst and a n-hexane reaction medium at a temperature of 75° C. High yields of the interesting aromatic propyne, N-propargyl-N-ethylaniline are obtained.

The above examples have to do with the preparation of acetylenic amines from secondary amines and cyclic imines. In the past, difficulty was encountered in reacting primary amines, carbonyl compounds and acetylene to produce acetylenic amino compounds. Under certain conditions suggested by the prior art, for example, primary amines reacted poorly; under other conditions reactions of primary amines with acetylene are quite good, but the desired products, although apparently formed, appear to condense or polymerize to high boiling products.

In spite of the foregoing, it has been discovered that an excellent reaction occurs when primary amines, carbonyl compounds and acetylene are reacted under the conditions described hereinabove in connection with the secondary amines. The reactions with the primary amines are slightly more exothermic and acetylene uptake is more rapid. In comparison with the secondary amines, reduced conversions are obtained with the primary amines.

EXAMPLE 11

Using the conditions of Example 1, n-butyl amine, acetylene and paraformaldehyde are reacted in the presence of cupric chloride, using a n-hexane reaction medium. Hexane in the amount of 150 grams, paraformaldehyde in the amount of 59.4 grams, and cupric chloride in the amount of 6.0 grams are added to the autoclave. Normal butyl amine in the amount of 142 grams is added to the resulting mixture at a uniform rate of about 0.79 gram/minute by means of a proportioning pump over a period of about six hours. Reaction temperature and pressure are the same as in Example 1. The reaction mixture is worked up in the manner of Example 1. The main reaction product is dipropargyl n-butyl amine. The yield of this material is 24.0%. Small amounts of monopropargyl n-butyl amine are also recovered.

EXAMPLE 12

Example 11 is repeated, with the exception that tertiary butylamine is substituted for n-butylamine. Good yields of monopropargyl t-butylamine and dipropargyl t-butylamine are obtained.

Under the conditions for preparing propargyl amines described hereinabove, a small yield of corresponding secondary products, i.e., diamino alkynes, are ordinarily produced. In the formation of propargyl diethylamine in Example 1, for instance, the secondary product is 1,4-bis(diethylamino)-2-butyne. The procedure described herein may be modified to specifically prepare diamino alkynes in high yields. The reaction is carried out in two steps: First, propargyl amine is prepared, for example, using the procedure of Example 1. Then, the acetylene atmosphere is removed, additional aldehyde is charged to the reactor, and the second step is completed by addition of a second portion of the amine, using the same conditions as employed in the first step of the reaction. The reaction proceeds stepwise according to the following equations:

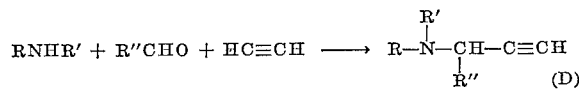

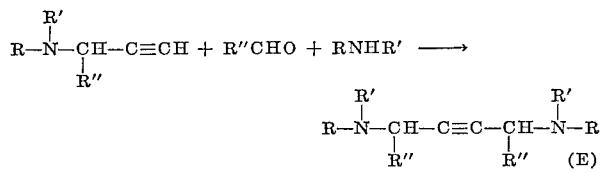

As will be noted, acetylene is a reagent only in the first step.

EXAMPLE 13

Following the procedure of Example 1, diethylamine is added to a reaction mixture of paraformaldehyde, acetylene, n-hexane and cupric chloride catalyst. When no further acetylene is taken up, the acetylene atmosphere is removed and an additional charge of 59.5 grams of paraformaldehyde is charged to the reactor. An additional 137.2 grams of diethylamine is then added to the reactor at a uniform rate, which is controlled by the proportioning pump. It should be noted that in this procedure, acetylene is a reagent only in the first step.

The reaction mixture is worked up following the procedure described in Example 1. The conversion to 1,4-bis(diethylamino)-2-butyne is comparable to the yield of propargyl diethylamine achieved in Example 1.

EXAMPLE 14

Example 13 is repeated, with the exception that morpholine is substituted for diethylamine. Comparable results are achived, the main product being 1,4-bis(morpholino)-2-butyne.

The acetylenic amines are useful as intermediates in preparing other nitrogen compounds. According to another embodiment of the present invention, new and useful N-acetylenic amides have been prepared, using amino alkynes, which have been prepared, for example, by the method of Example 11 or by other methods well known in the art, See, for example, Gardner et al., Journal of the Chemical Society, 1948, 780.

Acetylenic amides of the formula

 (4)

have been prepared where R and $R_1$ are members of the group consisting of aliphatic, alicyclic, aryl, and alkyl-aryl hydrocarbon radicals of the type described hereinabove in connection with the acetylenic amino compounds, and R″ may be a lower alkyl having up to about 6 carbon atoms and may also be hydrogen. Usually, R and $R_1$ in Formula 4 will have fewer than 20 carbon atoms, and preferably they will have fewer than 10 carbon atoms.

Compounds corresponding to Formula 4 have been prepared by the reaction of amino alkynes having an active hydrogen attached to the amino nitrogen and corresponding to the formula

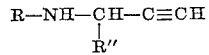

with acid halides or acid anhydrides. R and R″ in Formula 5 correspond to the radicals described in connection with Formula 4. Typical of the acid halides that may be used are the acid fluorides, chlorides, bromides, and iodides of acetic acid, butyric acid, propionic acid, benzoic acid, toluic acid, alicyclic carboxylic acids, such as the carboxylic acid of cyclopentane, and so forth. Among the acid anhydrides may be mentioned acetic anhydride, phthalic anhydride, and the like.

The reaction is preferably carried out at temperatures below room temperature, or below about 20° C., preferably between about 0° and 20° C. Any suitable organic solvent may be used as the reaction medium. Typical of such solvents are aromatic and aliphatic hydrocarbons. Such slovents are well understood in the art, and any of the conventional solvents may be used so long as they are inert to the reactants and products of reaction.

EXAMPLE 15

The compound 3-(n-butylamino)-1-butyne is prepared in a manner well known in the art by using the following procedure: n-butylamine (103 g.), tetrahydrofuran (225 cc.) and cuprous chloride (10 g.) are treated at 106° C. with a mixture of acetylene and nitrogen. The reaction is continued until no further acetylene is taken up and the products of reaction isolated in the manner described in Example 1. The reaction product contains 115 g. of 3-(n-butylamino)-1-butyne having a boiling point of 76° to 79° C./65 mm., and a refractive index of $n_D^{17°} = 1.4388$.

A reactor flask is equipped with a stirrer, thermometer, dropping funnel, condenser, cooling bath, and a T-joint for maintaining a nitrogen atmosphere.

Benzene (100.0 ml.) and acetyl chloride (17.2 g.) are placed in the reactor and cooled to between 10° and 15° C.

Twenty-five grams of the 3-(n-butylamino)-1-butyne prepared as above are added to the flask dropwise over a period of one hour. Still maintaining the temperature at 10° to 15° C., 25.3 grams of triethylamine are added over a period of about 45 minutes to neutralize by-product hydrogen chloride. Following addition of the triethylamine, the reaction mixture is stirred for about one hour.

The mixture is filtered, and the triethylamine hydrochloride filter cake is washed with small portions of benzene.

The filtrate is distilled under reduced pressure to obtain 25.8 grams of 3-(N-n-butyl-N-acetylamino)-1-butyne; B.P. 66–67° C./0.35 mm., $n_D^{20}$ —1.4639. The percent conversion of 3-(n-butyl-amino)-1-butyne to 3-(N-n-butyl-N-acetylamino)-1-butyne is 75 percent of theoretical. The C=CH analysis of the product was 15.0 percent (theory=14.95%). The product corresponds to the formula:

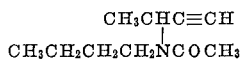

EXAMPLE 16

Normal butylamine is reacted with acetylene and paraformaldehyde according to Example 11 to produce a small amount of monopropargyl n-butyl amine.

Example 15 is repeated with the exception that monopropargyl n-butyl amine is substituted for the 3-(n-butylamino)-1-butyne. Comparable yields of 3-(N-n-butyl-N-acetylamino)-1-propyne are achieved.

EXAMPLE 17

Aniline is reacted with acetylene and paraformaldehyde according to Example 11 to produce a small amount of monopropargyl aniline.

Example 15 is repeated, with the exception that monopropargyl aniline is substituted for 3-(n-butyl-amino)-1-butyne. Comparable yields of 3-(N-phenyl-N-acetylamino)-1-propyne are achieved.

EXAMPLE 18

Example 15 is repeated, with the exception that benzoyl chloride is substituted for acetyl chloride. Comparable yields of 3-(N-n-butyl-N-benzoylamino)-1-butyne are obtained.

EXAMPLE 19

Cyclopentylamine is reacted with acetylene and paraformaldehyde according to Example 11 to produce a small amount of monopropargyl cyclopentylamine.

Example 15 is repeated, with the exception that monopropargyl cyclopentyl amine is substituted for 3-(n-butylamino)-1-butyne. A comparable yield of 3-(N-cyclopentyl-N-acetylamino)-1-propyne is achieved.

The acetylenic amino nitrogen compounds described herein are valuable initial materials for the preparation of solvents, pharmaceutical and dyestuffs. By themselves the acetylenic amino nitrogen compounds are effective corrosion inhibitors. Condensation products made therefrom are useful as pickling inhibitors, and the materials themselves may also be used as high energy fuels.

The acetylenic amides described herein are by themselves important corrosion inhibitors.

The invention in its broadest aspects is not limited to the specific compositions, steps and methods described, but departures may be made therefrom within the scope of the accompanying claim without departing from the principles of the invention and without sacrificing its chief advantages.

We claim:

A compound of the formula

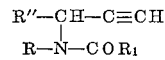

wherein R is a cyclic saturated hydrocarbon group of 5 to 8 carbon atoms, $R_1$ is an alkyl group of at most 10 carbon atoms, and R″ is a member selected from the group consisting of lower alkyl groups of up to 6 carbon atoms and hydrogen.

References Cited by the Examiner

UNITED STATES PATENTS 2,546,762   3/1951   Long _____ 260—558
3,078,275   2/1963   Moffett et al. _____ 260—558

FOREIGN PATENTS 917,424   9/1954   Germany.

OTHER REFERENCES

Hennion et al.: Jour. Am. Chem. Soc., vol. 75, p. 1653–1654 (1953).

Marszak-Fleury: Annales die Chemie, vol. 13, No. 3, p. 671 (1960).

Noller: Chemistry of Organic Compounds, 2nd ed., 161–63, 237, and 244, Philadelphia, Saunders, 1957.

Shriner et al.: The Systematic Identification of Organic Compounds, 3rd ed., pp. 177–78, N.Y., 1948. Wiley.

WALTER A. MODANCE, *Primary Examiner.*

NICHOLAS RIZZO, *Examiner.*

NATALIE TROUSOF, R. L. PRICE,
*Assistant Examiners.*